United States Patent [19]
Aidlin et al.

[11] Patent Number: 5,738,467
[45] Date of Patent: Apr. 14, 1998

[54] APPARATUS FOR THE FEEDING OF ARTICLES AT VARIABLE SPEEDS

[76] Inventors: Samuel S. Aidlin; Stephen A. Aidlin; Kenneth J. Cordonnier; Steven A. Zittel, all c/o Aidlin Automation Corporation, P.O. Box 13125, Sarasota, Fla. 34278-3125

[21] Appl. No.: 83,916

[22] Filed: Jun. 28, 1993

Related U.S. Application Data

[63] Continuation-in-part of Ser. No. 11,897, Feb. 1, 1993, abandoned.

[51] Int. Cl.$^6$ ........................................ B65G 51/02
[52] U.S. Cl. ........................ 406/86; 406/14; 406/88; 251/288
[58] Field of Search ........................ 406/10, 12, 14, 406/15, 86, 88; 415/146, 147, 148; 417/278; 137/488; 251/58, 288

[56] References Cited

U.S. PATENT DOCUMENTS

| | | | |
|---|---|---|---|
| 2,965,354 | 12/1960 | Grove et al. | 251/288 X |
| 3,105,720 | 10/1963 | Barker | 406/88 |
| 4,730,956 | 3/1988 | Lenhart | 406/88 |
| 4,738,287 | 4/1988 | Klinkel | 406/88 X |
| 4,822,214 | 4/1989 | Aidlin et al. | 406/88 X |

Primary Examiner—Andrew C. Pike

[57] ABSTRACT

An air-conveying apparatus for moving articles along a path of travel at varying speeds comprises in combination a pneumatic conveyor for supporting the articles, a fan operatively coupled to the conveyor to provide air under pressure to the pneumatic conveyor to convey the articles there along, a damper to restrict the flow of air through the fan, and a controller responsive to a signal to vary the positioning of the damper and thereby vary the flow of air through the fan and consequently vary the speed of the articles being conveyed.

1 Claim, 5 Drawing Sheets

APPARATUS FOR THE FEEDING OF ARTICLES AT VARIABLE SPEEDS

This application is a continuation-in-part application of U.S. patent application Ser. No. 08/011,897 filed Feb. 1, 1993, now abandoned.

BACKGROUND OF THE INVENTION

1. Field of the Invention

This invention relates to a method and apparatus for the feeding of articles at variable speeds and, more particularly, to improved air-conveying apparatus for moving articles along a path of travel at varying speeds comprising in combination a pneumatic conveyor for supporting articles, a fan operatively coupled to the conveyor to provide air under pressure to the pneumatic conveyors to convey articles there along, a damper to restrict the flow of air through the fan, and control means responsive to a signal to vary the positioning of the damper and thereby vary the flow of air to the fan and consequently vary the speed of articles being conveyed.

2. Description of the Background Art

Many types of bottles are in wide use today. An increasing number of bottles are manufactured from plastic resin due to low cost and high quality. Bottles of this type are usually formed from injection molded parisons. Injection molded parisons are blow-molded to the intended size by positioning the parison in a blow-molding unit, applying heat to the body portion of the parison, and then injecting air into the parison for forming into the desired shape. During the injection molding, blow molding, filling, and packaging processes, there is a need to convey such parisons and bottles from one location to another.

One state-of-the-art conveyor assembly for plastic bottles and like articles is disclosed in U.S. Pat. No. 4,822,214 to Aidlin. According to that disclosure, a parison, bottle, or other article to be conveyed is supported by a neck ring at the upper extent of its body. A plenum chamber is located above the neck rings. A centrally-positioned downwardly-extending trough is formed for receiving the neck ring and the neck portion of the article thereabove. A plurality of louvers are oriented on opposite sides the neck ring for creating an air flow on opposite sides of the neck for effecting its motion in a path of travel.

Another type of air conveyor is also disclosed in the aforementioned patent to Aidlin. The other type of conveyor includes a simple trough with a plenum chamber therebeneath. The upper surface of the plenum chamber is provided with a plurality of horizontal louvers constituting the lower surface of the trough. Short flat articles such as base cups are positioned in the trough for being conveyed by an air flow beneath the article. Such a conveying system is well suited for short, relatively flat articles to be conveyed.

A third type of pneumatic conveyer for use in association with bottle manufacturing is described in U.S. Pat. No. 4,284,370 to Danler. According to the Danler disclosure, two laterally-disposed louvers direct a flow of air to opposite sides of a bottle above the neck ring. Side curtains are required to preclude inadvertent rocking and jamming of the conveyed bottles. Pneumatic conveyors in use today, however, including those of the type disclosed in the above-described Danler patent, are excessively large and costly and do not employ the conveying air in an efficient manner for a wide variety of articles. As a result, the operation and use of such known pneumatic conveyors is inefficient, loud, and costly to both manufacture and operate. Further, the conveying often imparts a tipping to the conveyed articles resulting in jams and downtime of the equipment.

Pneumatic conveyors modules in use today, however, do not employ the conveying air in an efficient manner for a wide variety of articles traveling at a variety of speeds. As a result, the operation and use of such known pneumatic conveyors is restricted to one speed in a manner that is inefficient and costly to both manufacture and operate.

As illustrated by the large number of prior patents and known conveying techniques, efforts are continuously being made in an attempt to convey articles such as bottles more efficiently, conveniently, reliably, and economically. None of these previous efforts, however, provides the benefits attendant with the present invention Additionally, prior techniques do not suggest the present inventive combination of component elements as disclosed and claimed herein.

SUMMARY OF THE INVENTION

The invention is defined by the appended claims with a specific embodiment shown in the attached drawings. For the purpose of summarizing the invention, the invention may be incorporated into an system for pneumatically conveying articles along a path of travel at varying speeds comprising a pneumatic conveyor for supporting articles to be conveyed and a fan operatively coupled to the pneumatic conveyor to provide air under pressure to the pneumatic conveyors to convey articles there along. The system further includes a damper to restrict the flow of air to the fan and control means. The control means is responsive to a signal to vary the positioning of the damper and thereby vary the flow of air to the fan and consequently vary the speed of articles being conveyed. Additionally, the system includes adjustable stop means to vary the location of the first position and the second position, such as additional solenoid means to vary the adjustment of the stop means whereby the damper may pivot to any of four positions. Finally, the system includes sensor means along the path of travel to generate the signal to the control means.

The invention may also be incorporated into a damper assembly. The damper assembly is for use with a pneumatic conveyor having a fan and filter associated therewith to restrict the air flow to the conveyor to thereby vary the speed of articles conveyed there along. The damper assembly comprises a support housing preferably positionable intermediate the fan and filter. The damper may be located on either side of the fan while a filter may or may not be utilized. The support housing has an opening therethrough and a disk pivotally having a pivotal axis therethrough secured within the opening. The disk varies the amount of air flow from the filter to the fan and consequently varies the speed of the articles being conveyed. An oscillatable rod is coupled to the disk along the pivotal axis and extending through the housing and exterior thereof with a pivotal lever coupled thereto. The pivotal lever has a first end and a second end and a midpoint therebetween, the midpoint of the pivot lever being coupled to the pivot rod. A control means is operably coupled with the second end of the pivotal lever and is responsive to a signal to vary the positioning of the damper from a first position to a second position by effecting movement of the pivot lever to thereby vary the flow of air to the fan. Finally, stop means are cooperable with the first end of the pivotal lever to vary the location of the first position and the second position of the damper.

The invention may be further incorporated into a system for conveying articles along a path of travel at varying speeds. The system comprises, in combination, a plurality of pneumatic conveyor segments along a path of travel for supporting articles to be conveyed having a fan operatively coupled to each pneumatic conveyor segment to provide air under pressure to each pneumatic conveyor segment to convey articles there along. A damper is associated with each fan to restrict the flow of air through each fan. A plurality of sensor means are positioned along each conveyor segment along the path of travel. Each sensor means is adapted to sense conveyed articles and generate a signal. Further, control means are associated with each fan and are responsive to a signal from the sensor means to vary the position of the damper and thereby vary the flow of air through each fan and consequently vary the air force applied to, and consequently the speed of, the articles being conveyed. Finally, the system includes a central processor unit. The central processor unit couples each sensor means and control means for interrelating the speeds of the conveyor segments with respect to one another for operation of the system in a preprogrammed manner.

Lastly, the invention may be incorporated into a method of a system for conveying articles along a path of travel at varying speeds comprising in combination a pneumatic conveyor for supporting articles to be conveyed; a fan operatively coupled to the pneumatic conveyor to provide air under pressure to the pneumatic conveyors to convey articles there along; a damper to restrict the flow of air through the fan; and control means responsive to signal to vary the positioning of the damper and thereby vary the flow of air to the fan and consequently vary the speed of articles being conveyed.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

The present invention achieves its intended purposes, objectives, and advantages over the prior art devices through a new, useful, and unobvious combination of component elements which is simple to use, with the utilization of a minimum number of functioning parts, at a reasonable cost to manufacture and use, and by employing only readily available components.

Therefore, it is an object of this invention to provide a system for conveying articles along a path of travel at varying speeds comprising in combination a pneumatic conveyor or a plurality of conveyors for supporting articles to be conveyed, a fan operatively coupled to each pneumatic conveyor to provide air under pressure to the pneumatic conveyors to provide air under pressure to the pneumatic conveyors to convey articles therealong, a damper to restrict the flow of air through each fan, and control means responsive to a signal to vary the positioning of the damper and thereby vary the flow of air to the fan, and consequently vary the speed of articles being conveyed.

It is a further object of this invention to provide a method for conveying articles along a path of travel at varying speeds comprising the steps of providing a pneumatic conveyor for supporting articles to be conveyed; providing a fan operatively coupled to the pneumatic conveyor to provide air under pressure to the pneumatic conveyors to convey articles therealong; providing a damper to restrict the flow of air through the fan; and varying the position of the damper in response to as signal from a control means to thereby vary the flow of air to the fan and consequently vary the speed of articles being conveyed.

It is a further object of the invention to improve pneumatic conveying apparatus for bottles and like articles.

It is yet a further object of the invention to pneumatically convey like articles at a variable rate of speed by varying the amount of air flow through a fan imparting motion to the objects.

Lastly, it is an object of the present invention to monitor and control the flow of articles along a path of travel by varying the flow-directing forces along the path of travel as a function of the particular application.

The foregoing has outlined some of the more pertinent objects of the invention. These objects should be construed to be merely illustrative of some of the mere prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several drawings.

DETAILED DESCRIPTION OF THE PREFERRED EMBODIMENT

Figure 1:
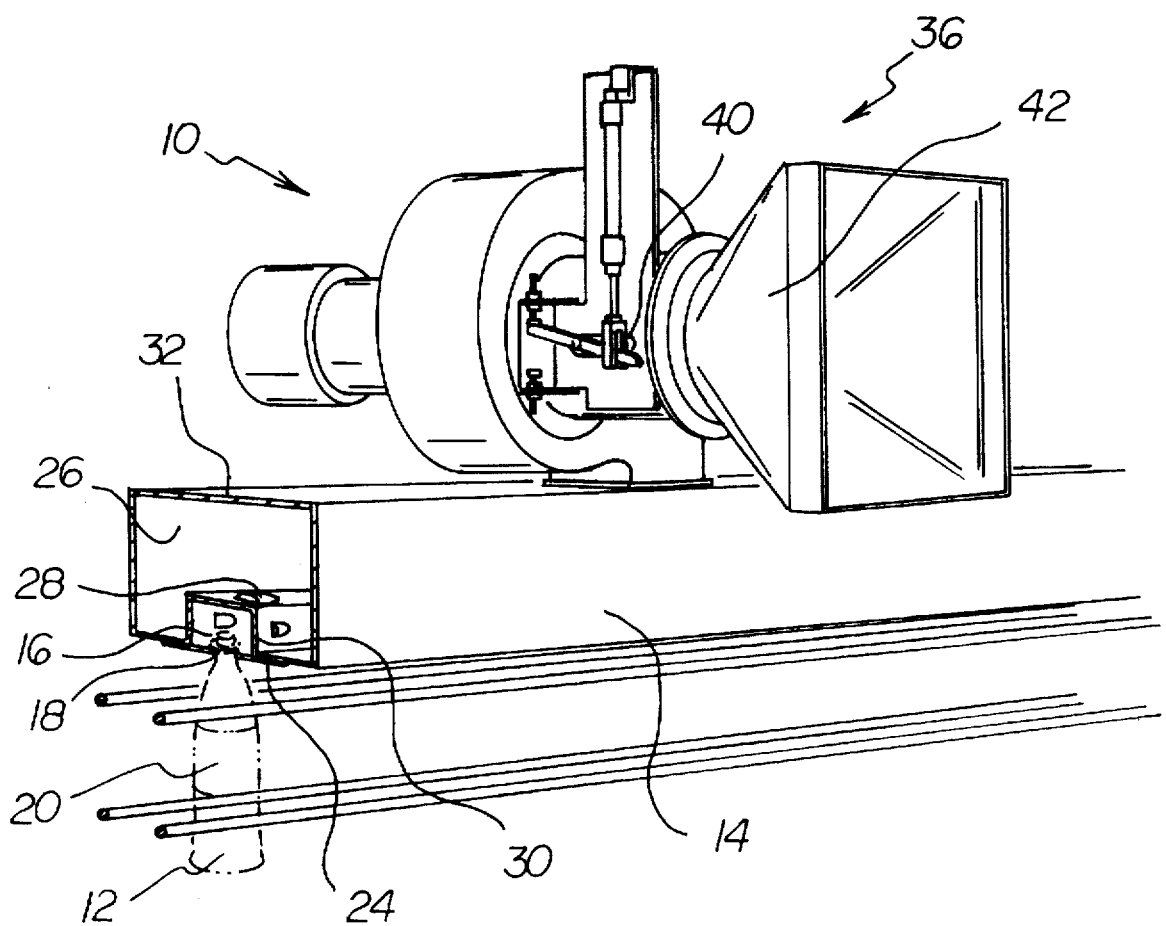
FIG. 1 is a perspective view, partially in cross section, of the conveyor apparatus constructed in accordance with the principles of the present invention.
Figure 2:
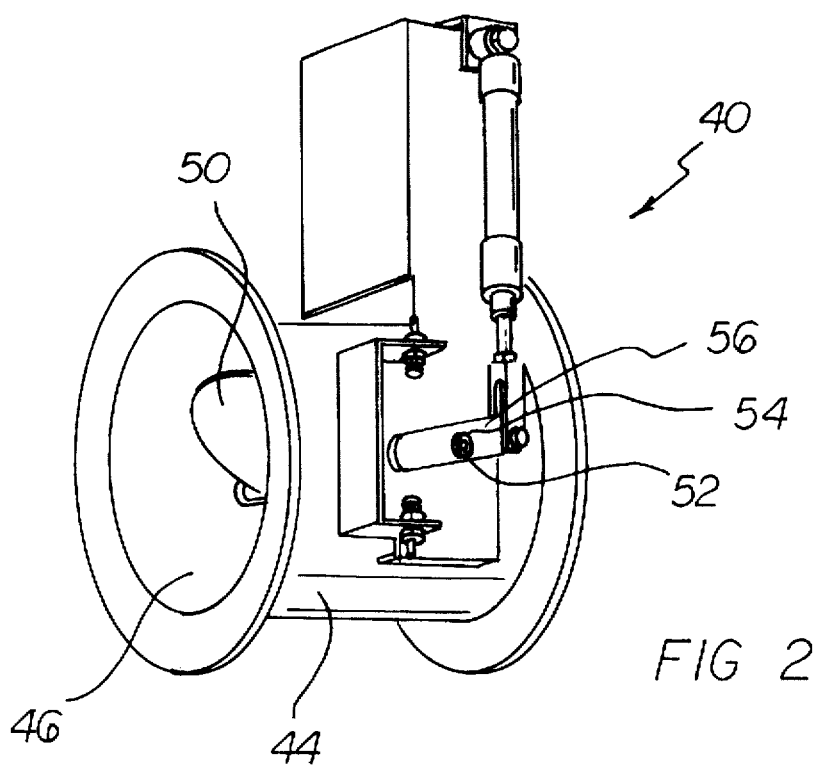
FIG. 2 is a perspective view of the damper assembly for the air conveyor apparatus.
Figure 3:
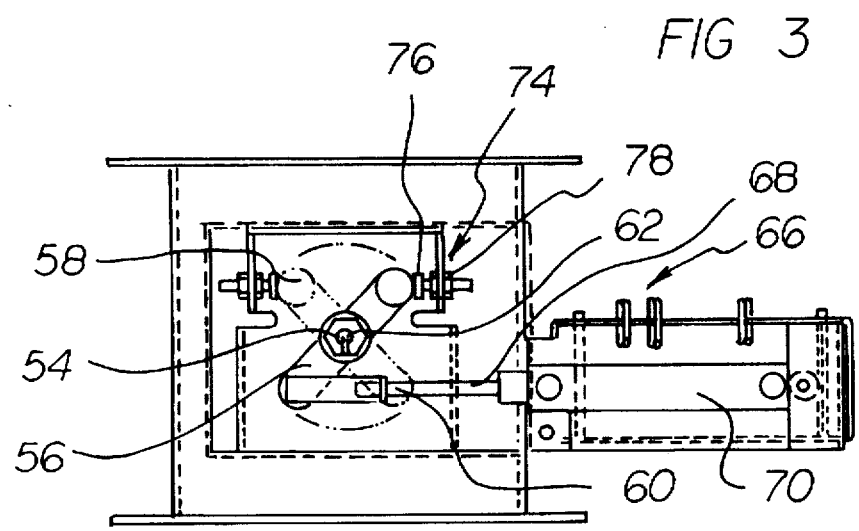
FIG. 3 is an elevational view of the damper assembly for the air conveyor apparatus.

With particular reference to FIGS. 1, 2, and 3, the apparatus is adapted for use with pneumatic conveyors and machines for manufacturing molded plastic articles and conveying the articles 12 along a path of travel at varying speeds. The apparatus comprises various components including a pneumatic conveyor 14 for transporting such articles from one location to another. Note FIG. 1. The articles may be blow-molded from polyethylene terephthalate (PET), for example, which is impervious to gases and can therefore be used with carbonated beverages. The articles are of the type having a threaded neck portion 16, a long slender body portion 20 and a neck ring 18 therebetween.

With particular reference to FIG. 1, the central component of the apparatus 10 is an pneumatic conveyor 14 for supporting articles 12 to be conveyed. The conveyor defines a path of travel along its length with means for receiving the upper portions of the article to be conveyed. Preferably, the conveyor comprises a pair of laterally spaced neck rails 24. As shown in FIG. 1, the neck rails define the path of travel along their lengths. The neck rails have upper surfaces for receiving the neck rings of the bottles being conveyed. A space between the neck rails defines an elongated slot therebetween. The slot slidable supports a bottle by its neck ring.

The apparatus further includes a plenum chamber 26. The plenum chamber is coupled to the upper surfaces of the neck rails 24. See FIG. 1. Further, the plenum includes directional louvers 28. In the preferred embodiment, the plenum chamber is formed of an inverted, U-shaped, interior channel member 30. This member extends upwardly from the neck rails and spans the slot. The member has a cross-sectional area sufficient to receive portions of the bottles above their neck rings. The interior channel member has a top wall and side walls coupled to the neck rails. Additionally, the top wall and side walls are all formed with air directing louvers formed therein as shown in FIG. 1. The air directing louvers provide a driving force for the bottles along the path of travel.

Furthermore, an inverted U-shaped, exterior channel member 32 is also coupled to the neck rails. The exterior channel member, like the interior channel member, extends upwardly from the path of travel and neck rails and encloses the interior channel member. The exterior channel member extends longitudinally the length of the slot.

Secured above the plenum chamber is a fan or blower 36. The fan is operatively coupled to the pneumatic conveyor 14 to provide air under pressure to the chambers to convey the articles there along. High pressure air is provided in the chamber by a fan or a plurality of periodically-spaced fans operatively mounted to the upper plenum chamber along the path of travel of the articles. The fans are in fluid communication with the plenum chamber 26 and are sized to provide air pressure to the plenum at a pressure about between 2.5 and 6.0 inches of water. The louvers are located in the side walls and top wall of the interior channel member of the plenum chamber and constitute between about 50 and 75 percent of the height of the threaded neck portion of the article, depending on weight, to be conveyed. Such louvers are generally located adjacent and above the threaded portion of the articles.

A damper assembly 40 is provided to restrict the flow of air to the fan 36. The damper assembly is secured intermediate the fan 36 and a filter 42 remote from the conveyor. The damper varies the amount of air flow through the fan and consequently varies the speed of the articles being conveyed by reducing the pressure in the chambers. The damper is positionable between two alternate positions. FIG. 3 shows the damper in a first position wherein air flow through the fan is maximized. The damper can be moved to a second position for minimal air flow as shown in dashed lines in FIG. 3. In the preferred embodiment, the damper assembly comprises a support housing 44 intermediate the fan and filter. The support housing has an opening 46 therethrough. A disk 50 is pivotally secured within the opening. The disk has a pivotal axis 52 therethrough and is formed of a rigid material such as aluminum.

Further, an oscillatable rod 54 is coupled to the disk along the pivotal axis 52 and extends through the housing 44 and exterior thereof. A pivotal lever 56 is coupled to the end of the oscillatable rod. The pivotal lever has a first end 58 and a second end 60 and a midpoint 62 therebetween. The end of oscillatable rod is securely coupled to the midpoint of the pivotal lever. Movement of the damper is effected by rotatably moving the oscillatable rod effected by movement of the pivotal lever.

In the preferred embodiment, the system includes control means 66 coupled to the second end of the pivotal lever. The control means is responsive to a signal to vary the positioning of the damper from the first position to the second position by effecting movement of the pivotal lever to thereby vary the flow of air to the fan and consequently vary the speed of articles being conveyed. Preferably, the control means is an actuator, preferably a solenoid operated air cylinder comprising a rod 68 and cylinder 70. Other actuators may be employed such as a rotary cylinder, a linear actuator, or the like. The actuator pivots the damper between the first position and second position to control the amount of air flow through the fan. The actuator rod is operably coupled to the second end of the pivotal lever secured to the oscillatable rod of the damper. Further, the cylinder is securely coupled to the fan housing.

Finally, the preferred embodiment of the system includes adjustable stop means 74. The stop means varies the location of the first position and the second position of the damper. Preferably, the stop means comprises a threaded bolt 76 and locking nuts 78 engaging the fan housing. The stop means allows the location of the damper in the first position and second position to be finely adjusted to effect the desired maximum and minimum air flows through the fan by rotating the threaded bolt clockwise or counterclockwise. From the first, full-open position, the damper is rotated about 90 degrees to the second, full-closed position. See FIG. 3. The first end of the pivotal lever contacts the stop means at the first location and second location to preclude further movement of the damper to thereby limit the range of movement thereof to control the amount of minimum and maximum air flow.

In operation and use, the apparatus for conveying articles along a path of travel at varying speed comprises a system positioned between the input point of feed and the output point of delivery for the articles to be conveyed. The fans 36 are then initiated to establish a high pressure within the plenum chamber to effect the flow of air through the louvers and holes into the trough., This creates a directed flow of air. The flow of air affects the lifting and feeding movement of the articles 12 to be conveyed. Articles are placed in the slot formed by the support rails at the input end with their neck rails resting on the upper horizontal surface of the support rails. The motion of the air will effect the lifting and feeding movement of the articles toward the output end. Articles are then continuously and sequentially placed in the input end of the conveyer for thereby creating a flow of articles, in contact one with another, along the entire length of the conveying apparatus. The articles are thereby conveyed and delivered to the output end of the conveyer in a continuous and automatic cycle of operation.

The speed of motion of the articles can be controlled through the change in air flow from the fans using the damper for varying the amount of air flow through the fan to thereby achieve plenum pressure required for the desired conveyor speed.

Figure 4:
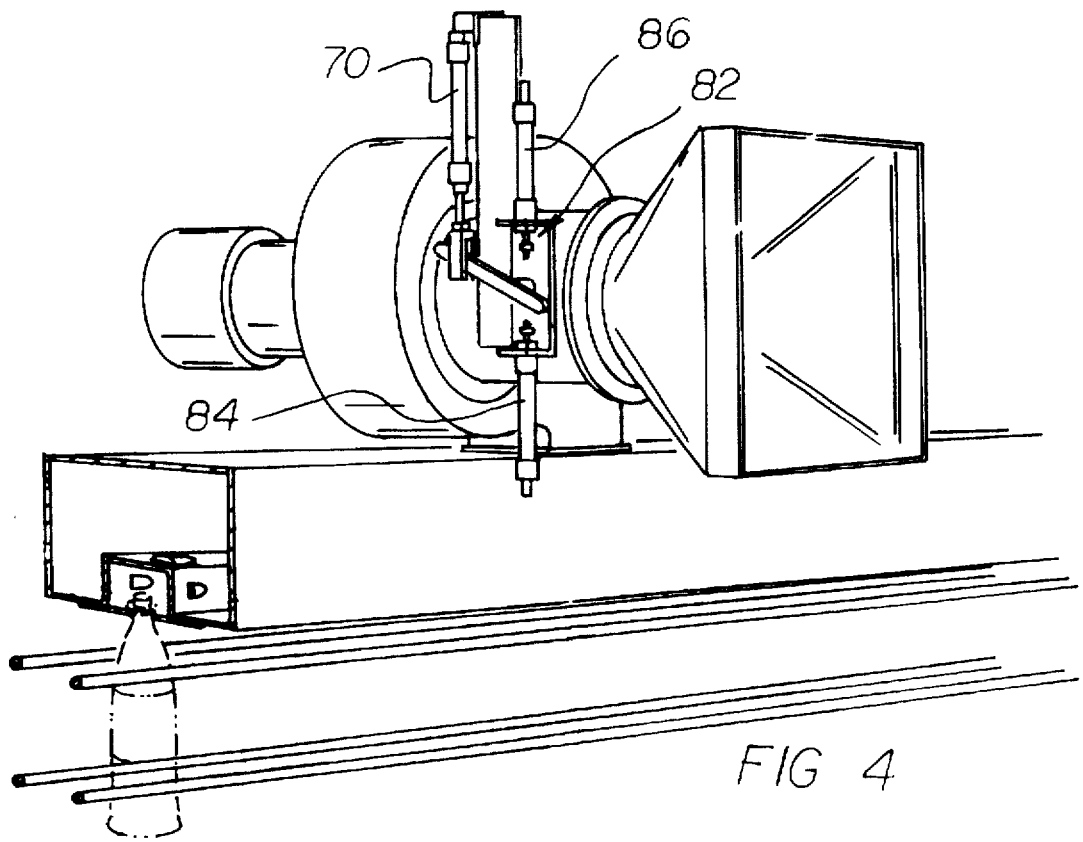
FIG. 4 is a perspective view, partially in cross section, of an alternate embodiment of the conveyor apparatus constructed in accordance with the principles of the present invention.
Figure 5:
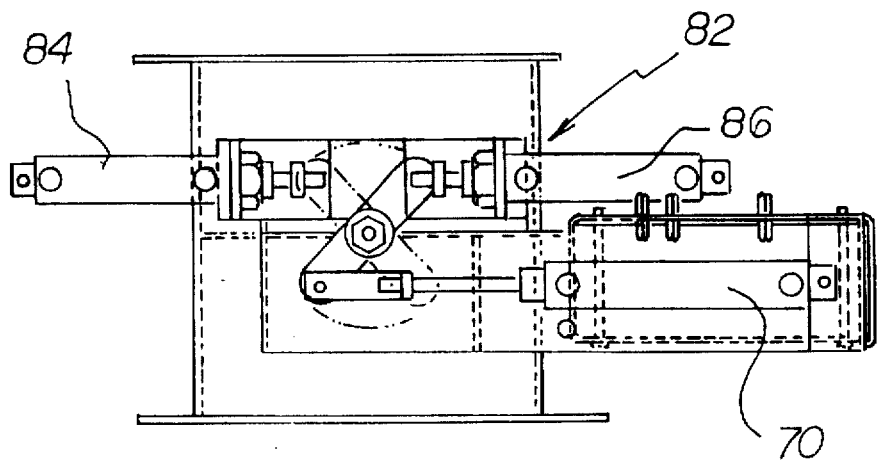
FIG. 5 is an elevational view of an alternate embodiment of the damper assembly for the air conveyor apparatus.

In an alternate embodiment, the system includes stop means 82 comprising additional actuator means as shown in FIGS. 4 and 5. The additional actuator means vary the adjustment of the stop means whereby the damper may pivot greater or lesser to any of four positions. For example, a first additional actuator means 84 varies the first position of the damper wherein the damper is allowed to pivot further to a first location to allow more air flow through the fan or a second location wherein less air is allowed to enter the fan. Similarly, a second additional actuator means 86 varies the second position of the damper wherein the damper is allowed to pivot further to a third location to allow less air flow through the fan or a fourth location wherein more air is allowed to enter the fan.

Figure 6:
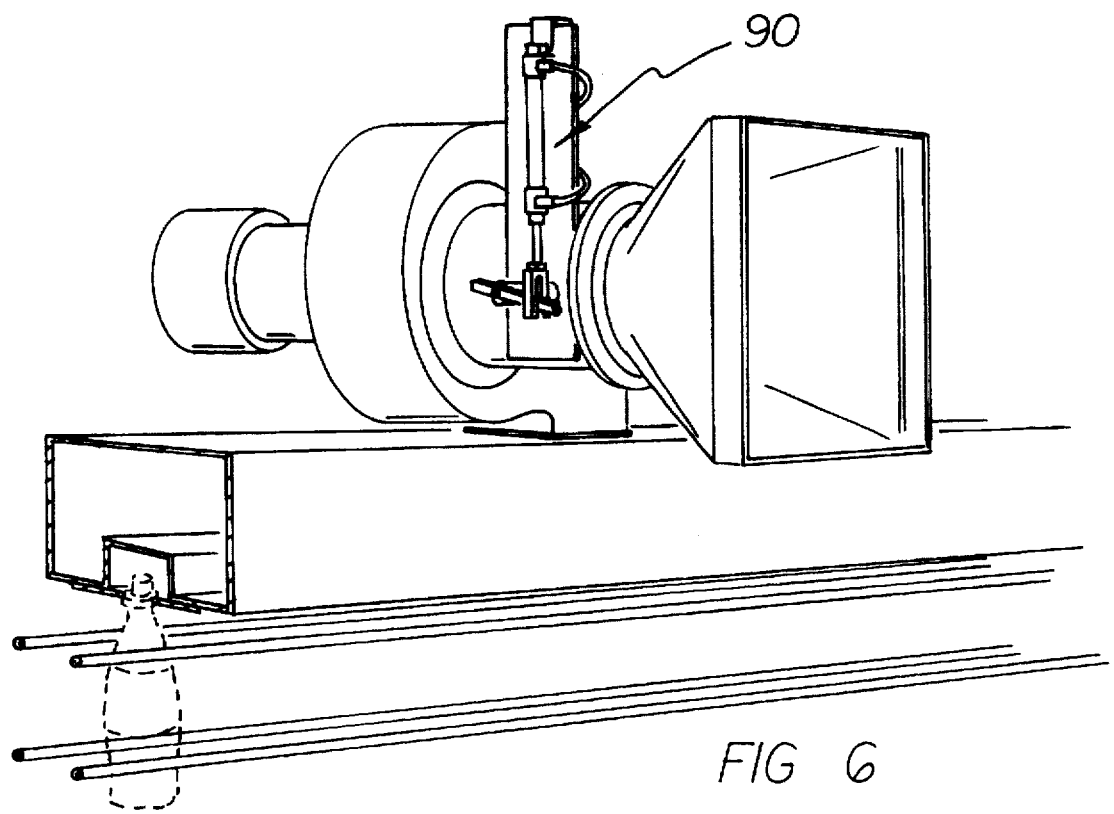
FIG. 6 is a perspective view, partially in cross section, of a further embodiment of the apparatus constructed in accordance with the principles of the present invention.
Figure 7:
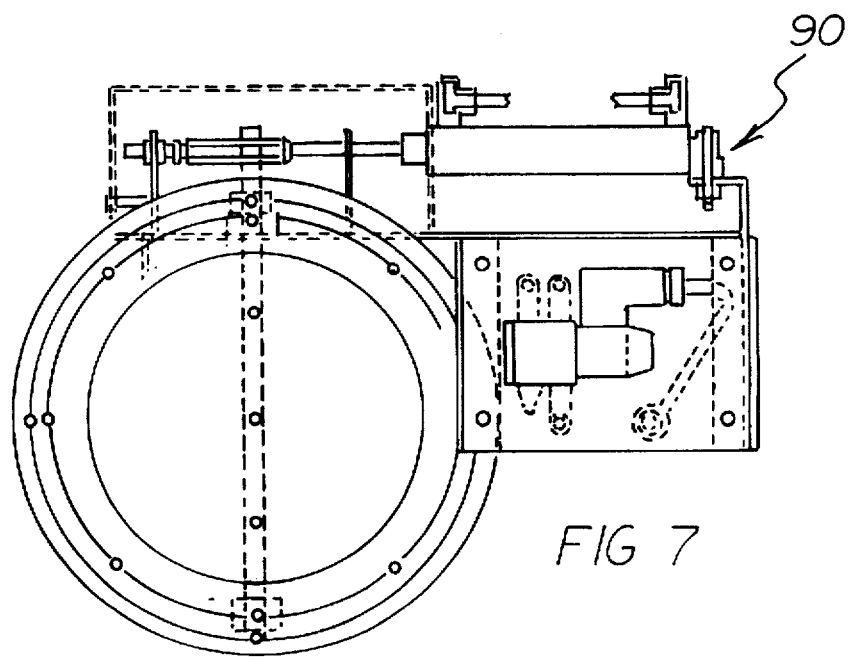
FIG. 7 is an elevational view of a further alternate embodiment of the damper assembly for the air conveyor apparatus.

In a further alternate embodiment of the invention, the system comprises control means 90 variable between an infinite plurality of positions. Note FIGS. 6 and 7. The infinitely adjustable control means allows for fine adjustment of the minimum and maximum air flow for achieving a precisely desired speed of articles being conveyed.

Figure 8:
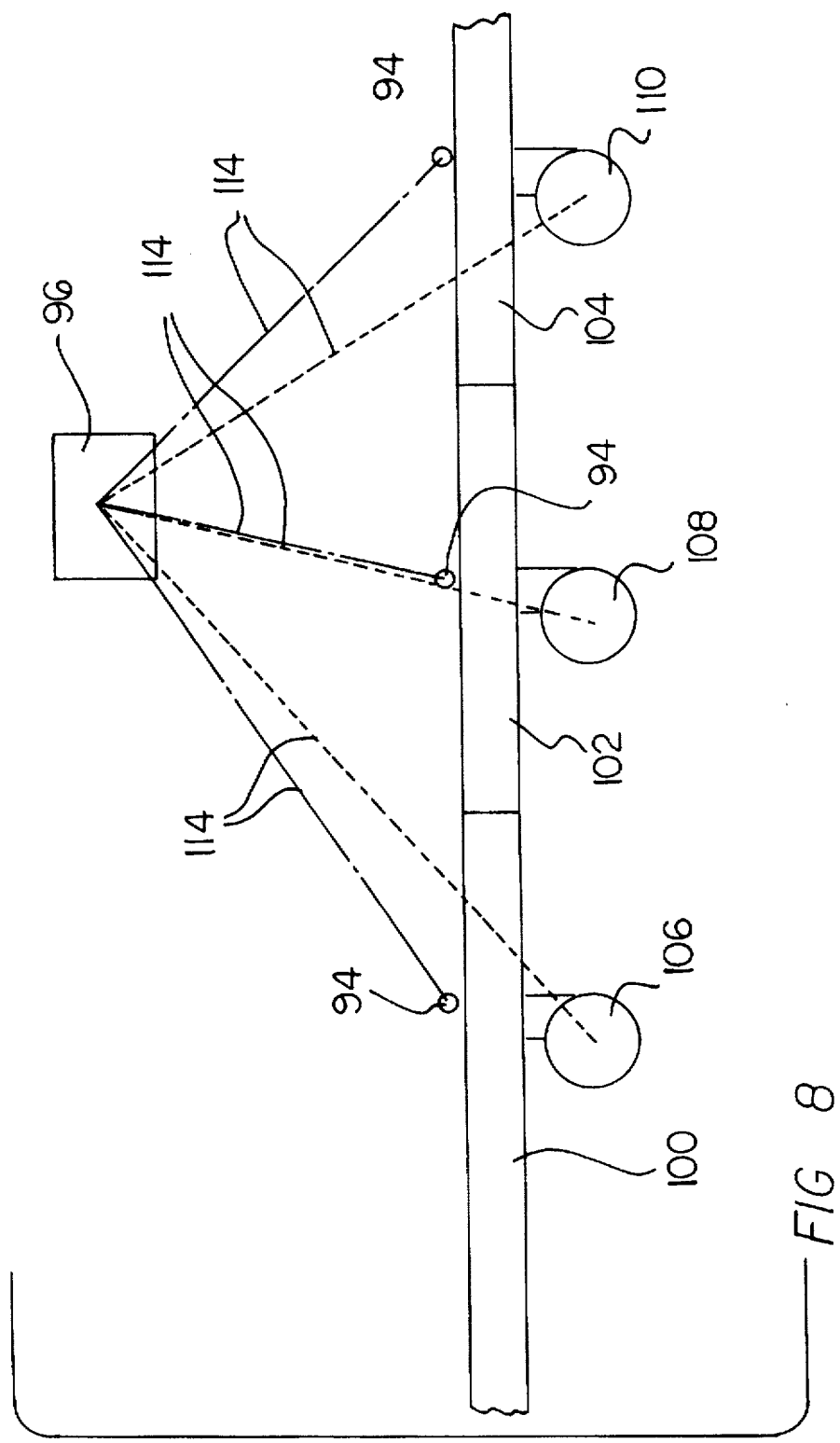
FIG. 8 is a schematic illustration of the control mechanisms of the conveyors of the prior Figures.

FIG. 8 illustrates a still further alternate embodiment wherein the system includes sensor means 94 along the path of travel to generate the signal to the control means. Each fan motor control means is coupled to a central processor unit 96 via the sensor. The central processor unit varies the pneumatic force as a function of the desired application.

FIG. 8 further illustrates an alternate embodiment of the invention wherein a plurality of segments 100, 102, and 104 of conveyors are coupled one to another in a manner to provide a distributed power supply. More specifically, each fan motor and damper associated therewith 106, 108, and 110 for providing the motive pneumatic forces to the conveyor segment is independent of each other except for common logic and control. Such fans and their motors may be of all the same size with dampers to provide variable forces or they may be of different sizes, but once again, capable of being run at different pressures.

In association with each segment of the conveyor are sensor means 94 and control means associated with each fan 106, 108, and 110 responsive to a signal from the sensor means to vary the position of the damper and thereby vary the flow of air through each fan and consequently vary the speed of articles being conveyed. A central processor unit 96 couples each sensor means and control means for interrelating the speeds of the conveyor segments with respect to one another for operation of the system in a preprogrammed manner. Each segment of the conveying system thus has its own driving force and sensor controlled by the common central processing unit. The central processing unit in like manner interrelates the speeds of the various segments 100, 102, and 104 one with respect to the other for operation in a preprogrammed manner operated by its individual fan, damper, control means, and the plurality of individual sensor means 94 provided to sense the conveyed articles at each such location and generate a signal. Electrical lines 114 couple the control means and the sensors with the central processor unit independent of each other.

For example, containers moving uphill will be provided with a greater motor force than those in a linear path. Similarly, various operating stations along a linear path associated with the conveyor could require different speeds of the conveyed articles. The central processor of the subject invention is adapted to accommodate such needs. In addition, the individual segments of a conveyor path are coupled one to another along the upper feed path but compartmentalized with barriers therebeneath insofar as their motor forces are concerned. The lengths of each segment could be longer or smaller than the others.

The invention also includes a method for conveying for conveying articles along a path of travel at varying speeds. The method comprises, in combination, the steps of first providing a pneumatic conveyor for supporting the articles to be conveyed. The method also includes the step of providing a fan operatively coupled to the pneumatic conveyors to provide air under pressure to the pneumatic conveyors to convey articles there along. The method also includes the step of providing a damper to restrict the flow of air through the fan. Lastly, the method also include the step of varying the position of the damper in response to a signal from a control means to thereby vary the flow of air through the fan and consequently vary the speed of articles being conveyed.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and combination and arrangement of parts may be resorted to without departing from the spirit of the invention.

Now that the invention has been described,

What is claimed is:

1. A system for conveying articles along a path of travel at any one of a plurality of varying speeds comprising in combination:

a pneumatic conveyor for supporting the articles to be conveyed;

a fan operatively coupled to the pneumatic conveyor to provide air under pressure to the pneumatic conveyor to convey articles in the path of travel therealong;

a damper to restrict flow of air through the fan;

control means responsive to a signal to vary positioning of the damper and thereby vary the flow of air to the fan and consequently vary a speed of the articles being conveyed along the path of travel, the control means being an actuator coupled to the damper to pivot the damper between a first position and a second position;

adjustable stop means to vary the first position and the second position; and additional actuator means to vary the stop means whereby the damper may pivot to any of four positions.

\* \* \* \* \*